3,133,949
NOVEL PREPARATION OF ORGANIC SULFATES
Alfred J. Rutkowski, Colonia, and Albin F. Turbak, New
 Providence, N.J., assignors to Esso Research and En-
 gineering Company, a corporation of Delaware
No Drawing. Filed July 1, 1960, Ser. No. 40,159
8 Claims. (Cl. 260—457)

This invention relates to a process for preparing organic sulfates from organometallic and/or organic metal-containing compounds. In particular, the invention relates to a novel process for preparing organic sulfates from such compounds containing a carbon-oxygen-metal linkage by controlled reactions of such compounds with sulfur trioxide.

In the past, attempts to react metal containing organic compounds with $SO_3$ have resulted in the formation of unidentifiable, tar-like products. It has now been discovered that good yields of organic sulfates, which can be recovered as pure compounds, can be prepared by reacting an organometallic compound with an $SO_3$-organic complex which partially reduces the activity of $SO_3$.

For purposes of simplification the term "sulfate" will herein refer to a monoester of sulfuric acid, i.e., a compound having the formula

wherein R is an organic radical. It is, of course, to be understood that the remaining acid group in such compounds may be neutralized by conventional techniques known to the art to form the corresponding salt of such acid. Thus, for example, the free acid may be separated and subsequently neutralized or the base employed for neutralization may be introduced to the reaction mixture and the sulfate recovered therefrom as the corresponding salt. Any basic material, e.g. hydroxides of group I alkali metals, ammonia, or substituted organic amines, may be employed to convert such acids to the salt desired.

Control of the reaction of $SO_3$ with organometallic or metal-containing organic compounds may be effected by admixing $SO_3$ with an organic complexing agent which may be termed a "Lewis base," i.e. an organic substance which can furnish electrons to be shared. See General Chemistry, Jones (1954), The Blakiston Company, Inc. (Library of Congress Catalog Card Number: 54–11108). $SO_3$ acts herein as a "Lewis acid," i.e. a substance which can accept a share in a pair of electrons furnished by another substance. The complexing agent partially reduces the activity of the $SO_3$. It is thus preferred that this compound be free of highly reactive functional groups that would react with $SO_3$ so as to form definite compounds.

The preferred complexes for use in this process may be prepared by admixing $SO_3$ with a Lewis base consisting of substituted hydrocarbons containing both phosphorus and oxygen combined therein. $SO_3$ complexes with these compounds can be prepared so as to reduce the $SO_3$ activity by different controlled amounts.

Other Lewis base compounds which may be used to prepare organic sulfates in the process of this invention include organic compounds selected from the group consisting of acyclic ethers, e.g. $C_4$–$C_{10}$ acyclic hydrocarbon ethers such as diethyl ether, dibutyl ether, dipentyl ether and any of the dialkyl ethers of polyalkyl oxide structures such as dibutyl Carbitol or halogen substituted ethers such as bis (beta chloroethyl ether); cyclic ethers, e.g. $C_4$–$C_{10}$ cyclic hydrocarbon ethers such as tetrahydrofuran, tetrahydropyran, dioxane, alkyl substituted dioxanes such as dipropyl dioxane; $C_3$–$C_{12}$ nitrogen substituted acyclic hydrocarbons containing a tertiary nitrogen atom, e.g. trimethyl amine, dimethyl aniline, tributyl amine etc.; nitrogen and oxygen substituted acyclic hydrocarbons, e.g. N,N'dimethyl formamide; and $C_5$–$C_{10}$ heterocyclic compounds containing nitrogen in the ring, e.g. pyridine, picoline, lutidine, quinoline, quinaldine, etc.

When $SO_3$ is combined with the preferred trialkyl phosphates the mole ratio of $SO_3$ to complexing agent may be in the range of 1:1 to 3:1. With compounds such as dioxane the range of this mole ratio is 1:1 to 2:1 and with compounds such as pyridine the complex with $SO_3$ is an equi-molar complex. It is, of course, to be understood that an excess of the complexing agent may be employed as a diluent.

It will be noted that in the aforementioned complexes the ratio of $SO_3$ to the completed complex can be made to vary. Thus, by decreasing the proportion of $SO_3$ in the complex, the activity of the complex is likewise decreased. Since the reactivity of the various organometallic compounds will vary according to type and structure, an $SO_3$ complex of the types aforementioned can be chosen in each instance which is sufficiently active to effect the desired reaction at a convenient temperature and at the same time one in which the activity of the $SO_3$ is sufficiently diminished to enable the reaction to proceed smoothly while yielding pure products. Thus, for example, with a reactive organometallic such as oxidized aluminum alkyls, the $(RO)_3PO/SO_3$ complex has sufficiently active $SO_3$ for producing the desired organic sulfates while for a relatively inactive metal containing organic feed a complex such as $(RO)_3PO/2SO_3$ or $(RO)_3PO/3SO_3$ containing more reactive $SO_3$ is preferred for the reaction. The varying reactivities of organometallics and $SO_3$ complexes are relative and do not limit the scope of the invention but merely serve to illustrate the versatility of the invention.

This control feature when applied to the reaction of $SO_3$ with an organometallic compound provides a means of selective sulfation wherein the $SO_3$ group is bonded to an oxygen atom which prior to the reaction was bonded to a metal constituent of the organometallic reactant. Thus, where an organic radical terminating in an oxygen atom is bonded through such oxygen atom to a metal constituent of the organometallic reactant, sulfation is selectively effected by inserting an $SO_3$ group between the oxygen atom and the metal constituent. On subsequent hydrolysis, these compounds yield R—$OSO_3H$ products.

The metal atoms of the organometallic and/or metal-containing organic reactant may be either monovalent or multivalent. The metallic constituent may be a metal selected from the metals of groups I, II and III of the periodic table, the metals of the first transition series of the periodic table, i.e. metals having an atomic number of 21 to 29 inclusive, silicon, germanium, tin and lead. With regard to group III metals aluminum and boron compounds are of particular interest. The organometallic compound may contain one or more metal atoms.

The organic component of such compounds may consist of one or more $C_2$ to $C_{30}$, preferably $C_6$–$C_{18}$ organic radicals which may be alkoxy, aryloxy, e.g. p-bromo phenoxy, o-nitro phenoxy, cycloalkoxy, arylalkoxy, or alkylarylalkoxy. Halogenated sulfates may be produced by this method where one or more hydrogen atoms of the foregoing radicals are replaced by a halogen atom, e.g.

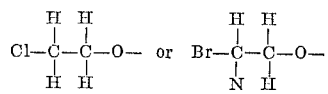

The acyclic portions of these radicals may be either straight or branched chain groups.

The invention is not limited to the use of organo-metallic compounds wherein the organic radicals attached to the metal constituent are of equal length or carbon number but may include radicals of varying size such as those obtained from growth type reactions of ethylene with organometallic compounds such as aluminum triethyl. The number of organic radicals in each organometallic compound will, of course, be limited by the number of metal constituents and the maximum valence of each metal constituent. The number of organic sulfate molecules which can be prepared from a given organometallic molecule is in turn dependent upon the number of such radicals. Although the process of this invention is not limited to organometallic compounds wherein each valence of a metal constituent is satisfied by an oxygen atom of an organic radical, organometallic compounds of this type are preferred. Those organometallic compounds containing at least one alkoxy or aryloxy radical but wherein one or more valences are satisfied with other radicals or atoms such as hydrogen, halogen, alkyl radicals and those wherein one or more valences are satisfied by a halogen substituted hydrocarbon radical may also be used.

Organometallic compounds containing a C—O—metal linkage may be prepared by oxidation of organometallic compounds containing a —C—metal linkage. The latter compounds may be prepared according to conventional methods such as reaction of Grignard reagents with metal halides, metal hydrides with olefins, and the like, or from growth type reactions such as those discussed in "Kinetics of Ethylene Polymerization with Aluminum Alkyls," International Symposium on Macromolecular Chemistry, Milan, Italy, September 26 to October 2, 1954. More specifically, one method for preparing organometallic compounds suitable for use with this invention is disclosed in Ziegler et al., U.S. Patent 2,781,410. In this process ethylene and aluminum alkyl such as aluminum triethyl unite to form higher alkyls of aluminum. The preparation of aluminum triethyl from aluminum hydride and ethylene is also described in this patent. The preparation of trisubstituted boranes of the type $R_3B$ wherein R is a hydrocarbon radical which can be aliphatic, alicyclic or aromatic is described in British Patent No. 804,341.

A suitable process for the oxidation of aluminum alkyls to produce R—O—M type compounds is described in detail in U.S. Patent No. 2,892,858 issued to K. Ziegler, June 30, 1959.

In carrying out the process of this invention, the organometallic and $SO_3$-complex reactants may be contacted with each other at a temperature in the range of —100° to +100° C. at pressures ranging from 0.5 up to 20 atmospheres or more for from 1 second to 1 hour. However, the reaction is preferably carried out at a temperature in the range of —10° to +40° C. under atmospheric pressure.

The reaction may be carried out employing only the reactants or with the aid of a diluent which will dilute the reaction mixture and thus serve as an additional control upon the activity of the $SO_3$ and aid in heat transfer. Diluents are preferred which maintain a single phase reaction mixture. Suitable diluents for use with this invention include halogen substituted hydrocarbons such as chlorobenzene, 1,2,dichloroethane, carbontetrachloride, chloroform, propylene dichloride, butyl chloride, butyl bromide, bromobenzene, 1,2,dibromoethane, carbon tetrabromide, tetrafluoroethane, difluorodichloroethane, difluorodichloromethane, tetrafluorodichloroethane. Where $SO_3$ is used directly, gaseous diluents such as nitrogen and the inert gases of group VIII of the periodic table are valuable. The specific periodic table referred to is the 1959 revised edition of the table designed in 1924 by Henry D. Hubbard, revised by William F. Meggers and published by W. M. Welch Manufacturing Company of Chicago, Illinois. If dioxane, pyridine, or N,N'-dimethyl formamide is employed as the complexing agent with $SO_3$, an excess of such compound may be employed as a diluent. Liquid and gaseous hydrocarbons such as benzene, toluene, and $C_1$ to $C_{10}$ hydrocarbons of the paraffin series may also be used. However, the halogenated hydrocarbon diluents are preferred. Of these the chlorinated hydrocarbons and particularly 1,2,dichloroethane are most preferred. Thus, the sulfonating complex may be admixed with or dissolved in an inert diluent, e.g. 0.5 to 95 wt. percent solution, prior to admixing it with the organometallic compound dissolved in the same or a different but compatible diluent. While the organometallic compound solution may contain as little as 1 wt. percent of organometallic compound, solutions containing as much as 95 wt. percent may also be used. However, the concentration of organometallic compound in the diluent will depend to a large extent on its solubility, and in some instances it may be desirable not to use a diluent. Since the sulfonating reaction is exothermic a cooling jacket or recycle means should be employed especially where little or no diluent is present in the reaction zone to dissipate the heat of reaction. The acid produced by the sulfation may be neutralized with an aqueous solution of an alkali or alkaline earth metal hydroxide, e.g. a 40–50 wt. percent solution of sodium hydroxide, and the metal salt thus produced may be dried either by heating it or mixing it with a dehydrating agent, such as anhydrous sodium sulfate. Any excess caustic and salts may be removed by extracting the reaction product with an alcohol, such as isopropanol. Other conventional methods of neutralization with ammonia, substituted organic amines etc. may be carried out by methods well known in the art.

The complexes employed in this invention are preferably prepared separately and admixed with the organometallic reactant. The complexes employed in this invention may be prepared at conditions such as those hereinbefore set forth for reacting the complex with the organometallic compound, i.e. between —100° to +100° C., at pressures ranging from 0.5 up to 20 atmospheres or more for from 1 second to 1 hour or more. When the reactants are admixed with adequate agitation, such as that obtained with an efficient stirrer, the reaction is almost instantaneous and therefore the time is principally dependent upon the rate of addition of the sulfur trioxide substance to the phosphorus-oxygen containing compound. Because the reaction is accompanied by a rise in temperature in the reaction zone, it may be desirable in some instances to employ either an internal cooling system, e.g. recycling, or an external coolant in a jacket. The amount of diluent employed to assist in the dissipation of heat will depend to a large extent on the reaction temperature. For instance at very low temperatures the inert diluent may contain up to 95 wt. percent of reactants while at temperatures approximately that of the room, e.g. 20°–25° C., the solvent may contain as little as 0.1 wt. percent reactants.

In the preparation of the $SO_3$ complexes with phosphorus and oxygen containing organic compounds the phosphorus may be either trivalent or pentavalent. Various organic phosphite, phosphinite, phosphinate, phosphate, phosphonate, phosphonite, pyrophosphate and metaphosphate compounds may be employed to prepare the complexed product. The compounds may contain from 0 to 3 ester oxygens in the case of the pentavalent phosphorus compounds and 1 to 3 ester oxygens in the case of the trivalent phosphorus compounds. These compounds may, of course, contain oxygen other than the aforesaid ester oxygens and by definition such oxygen will be present when ester oxygens are not present. The ester oxygens may have alkyl, aryl, alkylaryl, or arylalkyl groups attached to them containing 1 to 18 carbon atoms. Similar organic groups may be attached to the phosphorus directly. These organic groups should be relatively nonreactive, especially with the sulfur trioxide used to form the complex. If a reaction does occur between the sulfur trioxide and the organic group attached to the phosphorus, it will be necessary to use additional sulfur trioxide to compensate for this loss.

Among the organic phosphorus and oxygen containing compounds which may be employed to produce the complexes of the present invention are the following: triethyl phosphate, trimethyl phosphate, tripropyl phosphate, tri-butyl phosphate, tri-ethyl phosphite, trimethyl phosphite, tripropyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris (2,4-dichlorophenyl) phosphate, tris (2,4-dichlorophenyl) phosphite, bis (2,4-dichlorophenyl) hydrogen phosphate, bis (2,4-dichlorophenyl) hydrogen phosphite, tri (p-nitrophenyl) hydrogen phosphate, bis (p-nitrophenyl) hydrogen phosphite, tris (p-sulfophenyl) phosphate, tris (p-sulfophenyl) phosphite, 2,4-dichlorophenyl dihydrogen phosphate, 2,4-dichlorophenyl dihydrogen phosphite, tetraethyl pyrophosphate, tetramethyl pyrophosphate, dimethyl diethyl pyrophosphate, ethyl metaphosphate, bis (2,4-dichlorophenyl) diethyl pyrophosphate, sym-p-nitrophenyl pyrophosphate, p-nitrophenyl metaphosphate, tris (2-chloroethyl) phosphate, tetra (2-chloroethyl) pyrophosphate, diethyl dihydrogen pyrophosphate, di (2,4-dichlorophenyl) dihydrogen pyrophosphate, tris (2,4,6-trimethylphenyl) phosphate, tris (3,4,6-trimethylbenzyl) phosphate, trilauryl phosphate and tristearyl phosphate.

The complexes with pyridine, N,N′dimethyl formamide, dioxane, 3-chloroethyl ether, etc. may be prepared in the same manner as those prepared from phosphorus compounds.

Organic sulfates which may be prepared by this process include, by way of example methyl sulfate, ethyl sulfate, propyl sulfate, isopropyl sulfate, normal and isobutyl sulfate, β-phenyl ethyl sulfate, octyl sulfate, decyl sulfate, dodecyl sulfate, octodecyl sulfate, lauryl sulfate, palmityl sulfate, sulfates which are exemplified by the formula $$CH_3(CH_2)_xOSO_3H$$

where $x=0$ to 40 and by the formula

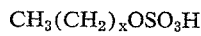

where $x=0$ to 40, R is alkyl, aryl, alkaryl, aralkyl, H, halogen, alkoxyl, aryloxy or any group not containing an active hydrogen for which the Hammett function is known or can be readily determined and $n$ signifies the number of condensed ring systems such as $n=1$ is benzene, $n=2$ is naphthalene, etc. The values of $n$ may vary between 1 and 7.

Other sulfates of value are those obtainable from cracked wax olefins which are branched or linear terminal olefins of $C_3$ to $C_{22}$ carbon numbers.

Still other sulfates of value would be those obtained by reacting a complexed $SO_3$ with the boric acid ester oxidation products of hydrocarbons.

Also of value are sulfates prepared from polymerized olefins containing a terminal olefinic bond, such as polybutenes, polypropylenes and polyethylenes.

In addition to mono-organic sulfates, disulfates can be prepared by this method from dimetal compounds which, by way of example, may be described by the following formulae:

FORMULA A

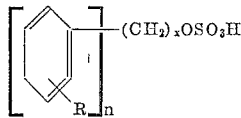

wherein R, R′, R″, and R‴ may be hydrogen, $C_1$ to $C_{10}$ alkyl, aryl, cycloalkyl, arylalkyl or alkylaryl groups and may be the same or different except where M or M′ are metals from group I, then the corresponding $(R'')_x$ or $(R''')_y$ equals zero; M and M′ are metals selected from the metals in groups I, II and III of the periodic table, the metals of the first transition series of the periodic table, i.e. metals having an atomic number of 21 to 29 inclusive, silicon, germanium, tin and lead; $n$ is a positive integer in the range of 2 to 10; $x$ is one less than the valence of M where R″ is a monovalent radical and two less than the valence of M where R″ is divalent; and $y$ is one less than the valence of M′ where R‴ is a monovalent radical and two less than the valence of M′ where R‴ is divalent.

FORMULA B

wherein R is a phenylene radical or a divalent polynuclear aromatic radical and M, M′, (R″) and (R‴) have values as defined above.

Unsaturated organic sulfates can also be prepared in accordance with the present invention from organometallic compounds having the general formula:

FORMULA C

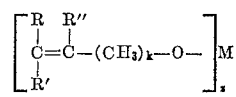

wherein $k$ is equal to 0 or a positive integer in the range of 1 to 10; R, R′ and R″ are selected from hydrogen, $C_1$ to $C_{10}$ alkyl, aryl, cycloalkyl, arylalkyl, or alkylaryl groups; M is a metal as defined in Formula A and $z$ is equal to the valence of M.

A few of the compounds represented by the foregoing general formulas are prepared by oxidation of the following compounds:

*Examples of Precursors of Formula A Compounds*

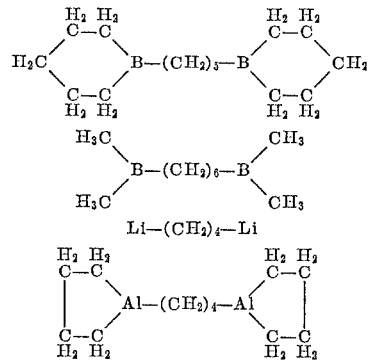

*Examples of Precursors of Formula B Compounds*

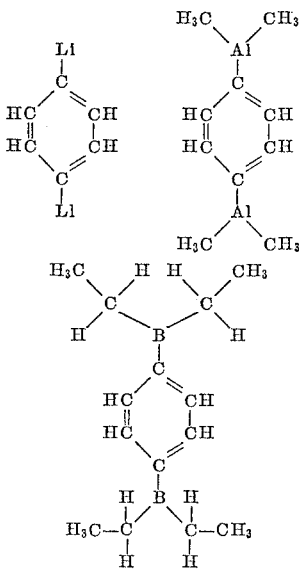

Examples of Precursors of Formula C Compounds

LiCH=CH$_2$
Sn(CH=CH$_2$)$_4$
B(CH$_2$—CH=CH$_2$)$_3$
Al(CH$_2$—CH=CH$_2$)$_3$
B(CH$_2$—CH=CH—CH$_3$)$_3$

Organic sulfates find use primarily as soaps, wetting agents, and detergents. They are also useful as emulsifying agents, antistatic agents for finishing synthetics, and as acid catalysts. Further, they are useful as alkylating agents. They are also useful in making greases, and under the proper hydrophilic-hydrophobic balance are of value as lubricating oil additives.

Properly constructed sulfates are useful for secondary oil recovery by detergent bank flooding techiniques.

The ease of hydrolysis of the lower molecular weight sulfates makes them valuable as acid releasing or so-called "acid splitting" agents which are valuable in the printing and dyeing trades and in polymer curing or catalyst reactions where slow or controllable acid formation is desirable.

The following examples are given to more fully illustrate the process of this invention. The examples are for purposes of illustration only and should not be construed as limiting the true scope of the invention as set forth in the claims.

Example 1

Into a 500 ml., 4-neck flask, fitted with a stirrer, cold water condenser, thermowell, and dropping funnel is placed 200 ml. of a 1,2 dichloroethane solution of 28.9 g. (0.07 mole) of aluminum tri-octoxide. Into the dropping funnel is placed 16.8 g. (0.21 mole) of sulfur trioxide diluted with 100 ml. of 1,2 dichloroethane. The solution of sulfur trioxide is added slowly. Initially the temperature of the reaction rises from 23° C. to 31° C. and the reaction mixture begins to turn yellow which deepens with further addition. The reaction mixture is cooled to 5° C. with an ice bath. In addition, to prevent further decomposition, 27.5 g. (0.15 mole) of triethyl phosphate is added to the dropping funnel. The phosphate ester is added after approximately 30% of the SO$_3$-dichloroethane solution is added. The complete addition requires about 30 minutes. The reaction mixture is then poured into a beaker which is then placed on a steam bath and the 1,2 dichloroethane is evaporated. The residue is dissolved in 500 ml. of water and this solution is neutralized with aqueous NaOH to a brilliant yellow end point. An equal volume of isopropyl alcohol is then added. Anhydrous sodium carbonate is added until a layer separation results. The isopropyl alcohol layer is removed and the alcohol is allowed to evaporate on a steam bath. There is obtained by this procedure 18.5 g. or a 37% yield of sodium octylsulfate which gives the following elemental analysis: Found C=39.50, H=7.10, Na=9.39 calculated for C$_8$H$_{17}$SO$_4$Na, C=41.5, H=6.93, Na=9.9.

Example 2

Into a 500 ml., 4-neck flask, fitted with a stirrer, cold water condenser, thermowell, and dropping funnel is placed 0.1 mole of aluminum tri-decoxide dissolved in 200 ml. of heptane. Into the dropping funnel is placed 0.3 mole of a 1/1 triethyl phosphate SO$_3$ complex diluted with 100 ml. of 1,2 dichloroethane. The solution of the sulfur trioxide triethyl phosphate complex is added slowly and the temperature is maintained between 25° and 35° C. with cooling. After complete addition the reaction mixture is poured into a beaker which is then placed on the steam bath and the heptane and 1,2 dichloroethane are evaporated. The residue is then dissolved with 500 ml. of water and the solution is neutralized with aqueous sodium hydroxide to brilliant yellow end point. An equal volume of isopropyl alcohol is then added and enough anhydrous sodium carbonate to cause a layer separation. The isopropyl alcohol layer is separated and the alcohol evaporated on a steam bath. After removal of the isopropyl alcohol there is obtained sodium decyl sulfate.

Example 3

The apparatus used is identical to that used in Example 2. Into the flask is placed 0.1 mole of aluminum tritetradecoxide dissolved in 200 ml. of chlorobenzene. The aluminum tritetradecoxide is prepared by the oxidation of a growth product obtained by the reaction of aluminum triethyl and ethylene. The tetradecyl alkyl group corresponds to the average value obtained from the growth reaction. Into the dropping funnel is placed 0.3 mole of a 1/1 SO$_3$ triethyl phosphate complex in 100 ml. of chlorobenzene. After complete addition of the SO$^3$ complex the reaction mixture is worked up by the same procedure as that given in Example 2. There is obtained by this procedure sodium tetradecyl sulfate.

Example 4

The apparatus used is identical to that given in Example 2. Into the flask is placed 0.1 mole of tri-hexadecyl borate dissolved in 200 ml. of dioxane. The tri-hexadecyl borate is prepared by the air oxidation of boron tri-hexadecyl in dioxane. Into the dropping funnel is placed 0.3 mole of SO$_3$ and 100 ml. of dioxane. After complete addition the reaction is worked up in the same procedure as that given in Example 2. There is obtained by this procedure sodium hexadecyl sulfate.

Example 5

The apparatus used is identical to that given in Example 2. Into the flask is placed 0.1 mole of triphenylborate in 200 ml. of dimethyl formamide. Triphenylborate is prepared by the air oxidation of triphenylborane in dimethyl formamide. Into the dropping funnel is placed 0.3 mole of sulfur trioxide in 200 ml. of dimethyl formamide. After complete addition of the SO$_3$ solution, the reaction is worked up in the same procedure as that given in Example 2. There is obtained by this procedure sodium phenyl sulfate.

Example 6

The apparatus used is identical to that given in Example 2. Into the flask is placed 0.1 mole of tricyclohexylborate dissolved in 200 ml. of pyridine. The tricyclohexylborate is prepared by the air oxidation of tricyclohexylborane. Into the dropping funnel is placed 0.3 mole of SO$_3$ in 100 ml. of pyridine. After addition of the pyridine solution, the reaction is worked up in the same procedure as that given in Example 2. There is obtained by this procedure, sodium cyclohexyl sulfate.

Example 7

The apparatus used is identical to that given in Example 2. Into the flask is placed bis (2-phenyl ethoxy) magnesium dissolved in 200 ml. of dibutyl ether. The bis (2-phenyl ethoxy) magnesium is prepared by the air oxidation of bis (2-phenyl ethyl) magnesium. Into the dropping funnel is placed 0.3 mole of SO$_3$ and 100 ml. of dibutyl ether. After complete addition of the SO$_3$ complex to the magnesium compound the reaction mixture is worked up in the same procedure as that given in Example 2. There is obtained by this precedure sodium 2-phenyl ethyl sulfate.

Thus, by complexing SO$_3$ with an organic Lewis base, preferably trialkyl phosphates, the activity of SO$_3$ can be controlled so as to produce valuable organic sulfates in reaction with organometallic compounds having an oxygen atom separating a metal constituent and an organic radical therein.

This application is a continuation-in-part of application Serial No. 861,744, filed December 24, 1959.

What is claimed is:

1. A process for producing an organic sulfate having the formula

R—O—SO$_3$H wherein R represents a $C_2$ to $C_{30}$ alkyl radical which comprises admixing $SO_3$ with a trialkyl phosphate compound and contacting the resulting complex with a metal-containing organic compound having a metal constituent selected from the group consisting of aluminum, boron and magnesium the valences of said metals being satisfied by alkoxy radicals containing from 2 to 30 carbon atoms, at a temperature in the range of $-100°$ C. to $+100°$ C., and recovering the resulting alkyl sulfate.

2. A process in accordance with claim 1 wherein each of said alkoxy radicals contains from 6 to 18 carbon atoms.

3. A process in accordance with claim 1 wherein said trialkyl phosphate compound is triethyl phosphate.

4. A process in accordance with claim 1 wherein said metal-containing organic compound is aluminum trioctylate.

5. A process in accordance with claim 1 wherein the said metal constituent is aluminum.

6. A process in accordance with claim 1 wherein the said metal constituent is boron.

7. A process for producing an organic sulfate which comprises admixing $SO_3$ with an organic phosphorus and oxygen compound selected from the group consisting of triethyl phosphate, trimethyl phosphate, tripropyl phosphate, tri-butyl phosphate, triethyl phosphite, trimethyl phosphite, tripropyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris (2,4-dichlorophenyl) phosphate, tris (2,4-dichlorophenyl) phosphite, bis (2,4-dichlorophenyl) hydrogen phosphate, bis (2,4-dichlorophenyl) hydrogen phosphite, tris (p-nitrophenyl) hydrogen phosphate, bis (p-nitrophenyl) hydrogen phosphite, tris (p-sulfophenyl) phosphate, tris (p-sulfophenyl) phosphite, 2,4-dichlorophenyl dihydrogen phosphate, 2,4-dichlorophenyl dihydrogen phosphite, tetraethyl pyrophosphate, tetramethyl pyrophosphate, dimethyl diethyl pyrophosphate, ethyl metaphosphate, bis (2,4-dichlorophenyl) diethyl pyrophosphate, sym-p-nitrophenyl pyrophosphate, p-nitrophenyl metaphosphate, tris (2-chloroethyl) phosphate, tetra (2-chloroethyl) pyrophosphate, diethyl dihydrogen pyrophosphate, di (2,4-dichlorophenyl) dihydrogen pyrophosphate, tris (2,4,6-trimethylphenyl) phosphate, tris (3,4,6-trimethylbenzyl) phosphate, trilauryl phosphate and tristearyl phosphate to form a complex therewith, contacting the resulting complex with a metal-containing organic compound containing a metal selected from the group consisting of aluminum, boron and magnesium, at least one valence of said metal being satisfied by an organic radical of from 2 to 30 carbon atoms selected from the group consisting of alkoxy, aryloxy, cycloalkoxy, arylalkoxy and alkylaryloxy radicals and the aforesaid radicals in which one or more hydrogen atoms are replaced by a halogen atom said metal constituent being chemically bonded to the oxygen atom of the aforesaid organic radicals, any valences of said metals not satisfied by the aforesaid organic radicals of from 2 to 30 carbon atoms being satisfied by a member of the group consisting of hydrogen, halogen, alkyl and halogen substituted alkyl radicals, at a temperature in the range of $-100°$ C. to $+100°$ C., neutralizing the resulting organic sulfate acid with an alkali metal hydroxide and recovering the resulting alkali metal salt of said organic sulfate acid.

8. A process is accordance with claim 7 wherein said alkali metal hydroxide is sodium hydroxide.

References Cited in the file of this patent

UNITED STATES PATENTS

| | | |
|---|---|---|
| 2,336,230 | Dickey et al. | Dec. 7, 1943 |
| 2,399,434 | Graenacher et al. | Apr. 30, 1946 |
| 2,402,647 | Lecher et al. | June 25, 1946 |
| 2,495,220 | Bell | Jan. 24, 1950 |

OTHER REFERENCES

Baker et al.: Jour. Am. Chem. Soc., vol. 75, pp. 5193–5194 (1953).

Rochow et al.: "The Chemistry of Organometallic Compounds" (1957) pp. 279–280.

Groggins: "Unit Processes in Organic Synthesis" 5th Ed. (1958) pp. 326–329.